United States Patent
Huang et al.

(10) Patent No.: US 11,425,225 B2
(45) Date of Patent: Aug. 23, 2022

(54) METHOD, APPARATUS, AND EQUIPMENT FOR EXPOSING EDGE NETWORK CAPABILITY, AND STORAGE MEDIUM

(71) Applicant: ZTE CORPORATION, Guangdong (CN)

(72) Inventors: Qiang Huang, Guangdong (CN); Xiangliu Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 53 days.

(21) Appl. No.: 16/762,961

(22) PCT Filed: Oct. 12, 2018

(86) PCT No.: PCT/CN2018/110039
§ 371 (c)(1),
(2) Date: May 11, 2020

(87) PCT Pub. No.: WO2019/095908
PCT Pub. Date: May 23, 2019

(65) Prior Publication Data
US 2020/0404073 A1   Dec. 24, 2020

(30) Foreign Application Priority Data
Nov. 20, 2017 (CN) .......................... 201711158243.8

(51) Int. Cl.
*H04L 67/63*  (2022.01)
*H04L 67/289* (2022.01)
(Continued)

(52) U.S. Cl.
CPC ............ *H04L 67/63* (2022.05); *H04L 67/289* (2013.01); *H04W 88/18* (2013.01)

(58) Field of Classification Search
CPC ..... H04L 67/32; H04L 67/327; H04L 67/289; H04L 67/2866; H04W 88/18
See application file for complete search history.

(56) References Cited

U.S. PATENT DOCUMENTS

| | | | |
|---|---|---|---|
| 9,942,825 B1 * | 4/2018 | Narayanan | H04L 63/306 |
| 2007/0014291 A1 * | 1/2007 | Zhang | H04L 12/185 370/390 |

(Continued)

FOREIGN PATENT DOCUMENTS

| | | |
|---|---|---|
| CN | 103702352 A | 4/2014 |
| CN | 106900011 A | 6/2017 |

(Continued)

OTHER PUBLICATIONS

China Patent Office, First Office Action dated Dec. 28, 2020 issued in corresponding Chinese Application No. 201711158243.8.

(Continued)

*Primary Examiner* — Jenee Holland
(74) *Attorney, Agent, or Firm* — Li & Cai Intellectual Property (USA) Office

(57) ABSTRACT

The present application discloses a method, an apparatus, and equipment for exposing edge network capability, and a storage medium. The method includes: receiving a network capability service request sent by a mobile edge computing platform; determining a provider of the network capability service requested by the mobile edge computing platform according to the network capability service request; and, if it is determined that the provider of the network capability service is a core network, providing the network capability service of the core network for the mobile edge computing platform.

17 Claims, 6 Drawing Sheets

(51) Int. Cl.
*H04W 88/18* (2009.01)
*H04L 47/762* (2022.01)
*H04L 12/46* (2006.01)
*H04L 67/10* (2022.01)
*H04L 67/51* (2022.01)
*H04L 41/50* (2022.01)
*H04L 41/5051* (2022.01)
*H04L 43/091* (2022.01)
*H04L 45/74* (2022.01)

(56) References Cited

U.S. PATENT DOCUMENTS

| | | | | |
|---|---|---|---|---|
| 2010/0157887 | A1* | 6/2010 | Kopplin | H04L 47/15 370/328 |
| 2010/0271979 | A1* | 10/2010 | Godin | H04W 24/02 370/255 |
| 2011/0269421 | A1* | 11/2011 | Moore | H04L 12/1467 455/406 |
| 2012/0040687 | A1* | 2/2012 | Siomina | H04W 8/24 455/456.1 |
| 2012/0189016 | A1* | 7/2012 | Bakker | H04W 76/11 370/401 |
| 2013/0304857 | A1* | 11/2013 | Li | H04L 67/18 709/217 |
| 2014/0286282 | A1* | 9/2014 | Jamadagni | H04W 36/0022 370/329 |
| 2015/0172965 | A1* | 6/2015 | Jeong | H04W 36/385 370/331 |
| 2016/0366244 | A1 | 12/2016 | Chiu et al. | |
| 2017/0127409 | A1* | 5/2017 | Mishra | H04W 28/16 |
| 2017/0347307 | A1* | 11/2017 | Mehta | H04W 76/15 |
| 2018/0035360 | A1* | 2/2018 | Rasanen | H04W 48/14 |
| 2018/0049179 | A1* | 2/2018 | Shah | H04W 72/048 |
| 2018/0063740 | A1* | 3/2018 | Mccormick | H04W 28/0236 |
| 2018/0077294 | A1* | 3/2018 | Rasanen | H04L 67/289 |
| 2018/0123950 | A1* | 5/2018 | Garg | H04L 47/2408 |
| 2018/0159765 | A1* | 6/2018 | Shi | H04L 45/24 |
| 2018/0184323 | A1* | 6/2018 | Xiong | H04W 84/045 |
| 2018/0246768 | A1* | 8/2018 | Palermo | G06F 9/5027 |
| 2018/0249317 | A1* | 8/2018 | Kurasugi | H04W 8/18 |
| 2018/0270720 | A1* | 9/2018 | Shi | H04L 12/28 |
| 2018/0270780 | A1* | 9/2018 | Xiong | H04W 24/10 |
| 2018/0310350 | A1* | 10/2018 | Stojanovski | H04W 36/12 |
| 2018/0352051 | A1* | 12/2018 | Tsai | H04L 67/60 |
| 2018/0367637 | A1* | 12/2018 | Balazinski | H04N 21/64322 |
| 2019/0098474 | A1* | 3/2019 | Zhu | H04W 4/50 |
| 2019/0166518 | A1* | 5/2019 | Arora | H04W 28/0284 |
| 2019/0191341 | A1* | 6/2019 | Trang | H04W 36/0061 |

FOREIGN PATENT DOCUMENTS

| | | |
|---|---|---|
| CN | 106998345 A | 8/2017 |
| CN | 107018534 A | 8/2017 |
| CN | 107333267 A | 11/2017 |
| EP | 3410773 A1 | 12/2018 |
| WO | 2017091934 A | 6/2017 |
| WO | 2017100640 A1 | 6/2017 |
| WO | 2017187011 A | 11/2017 |

OTHER PUBLICATIONS

Korean Patent Office, Notification of Reason for Refusal dated Feb. 25, 2021 issued in corresponding Korean Application No. 10-2020-7010306.
WIPO, International Search Report dated Jan. 4, 2019 corresponding to application No. PCT/CN2018/110039.
"Support of Groups and improvements of the support of Edge Computing," NOKIA, SA WG2 Meeting #122, S2-174154-23501-5.13(MEC)-v2.
European Patent Office, The extended European search report dated May 31, 2021 for application No. EP18878414.4.
Korean Patent Office, Second Office Action dated Aug. 23, 2021 for application No. KR10-2020-7010306.
Japan Patent Office, First Office Action dated Aug. 24, 2021 for application No. JP2020-526257.
3GPP, "Technical Specification Group Services and System Aspects; Procedures for the 5G System; Stage 2 (Release 15)", 3GPP TS 23.502, Nov. 14, 2017.

* cited by examiner

METHOD, APPARATUS, AND EQUIPMENT FOR EXPOSING EDGE NETWORK CAPABILITY, AND STORAGE MEDIUM

CROSS-REFERENCE TO RELATED APPLICATIONS

This is a National Phase Application filed under 35 U.S.C. 371 as a national stage of PCT/CN2018/110039, filed on Oct. 12, 2018, an application claiming the priority of Chinese Patent Application No. 201711158243.8, filed on Nov. 20, 2017, the contents of which are incorporated herein in their entirety by reference.

TECHNICAL FIELD

The present application relates to, but is not limited to, the field of communications, and in particular, relates to a method, an apparatus, and equipment for exposing edge network capability, and a storage medium.

BACKGROUND

The rapid development of mobile communication has permeated all aspects of people's work, social activities and life, and made a significant impact on all aspects of people's lifestyles and ways of work, and social politics and economy. The human society has entered the information age, and the demand for service applications in all aspects explode. In the future, mobile networks not only provide communication between people, but also provide services for massive devices in the Internet of Things. For example, for the services requiring ultrahigh speeds, such as virtual reality and high-definition videos, the rate in the future may be 10 to 100 times as fast as the current rate; for example, for the services requiring low latency, such as the Internet of Vehicles, the end-to-end delay may be reduced by 5 times; the Internet of Things may be accessed by services which are 1000 times as many as the current services, and the service life of batteries can be prolonged to 10 times as long as the current service life of batteries.

With the growth of low-latency and high-bandwidth services, Apps (applications) for carrying services are deployed closer and closer to UE (User Equipment), which may not only shorten a delay but also save transmission bandwidth, that is, the edge computing which thrives at present. For operators, in addition to incorporating computing operation of Apps into their revenue systems, mobile edge computing (MEC) further exposes mobile communication network capabilities to App developers for them to use, such as UE location information, and providing a higher QoS (Quality of Service) level for VIP (Very Important People) of an App. Exposure of network capabilities of edge nodes may make the operators more competitive in terms of pipelines and computing, and bring a totally new business model for the operators.

Therefore, how to expose network capabilities to a mobile edge computing platform has become an urgent problem to be solved.

SUMMARY

A summary is provided below for the subject matter which is described in detail in the present application, but it is not intended to limit the protection scope of the claims.

The embodiments of the present application provide a method, an apparatus, and equipment for exposing edge network capability, and a storage medium, which can achieve exposing network capabilities to a mobile edge computing platform.

In one aspect, an embodiment of the present application provides a method for exposing edge network capability, including: receiving a network capability service request sent by a mobile edge computing platform; determining a provider of the network capability service requested by the mobile edge computing platform according to the network capability service request; and in response to that it is determined that the provider of the network capability service is a core network, providing the network capability service of the core network to the mobile edge computing platform.

In another aspect, an embodiment of the present application provides an apparatus for exposing edge network capability, including: a receiving module configured to receive a network capability service request sent by a mobile edge computing platform; a determining module configured to determine a provider of the network capability service requested by the mobile edge computing platform according to the network capability service request; and a processing module configured to provide the network capability service of a core network to the mobile edge computing platform in response to that it is determined that the provider of the network capability service is the core network.

In another aspect, an embodiment of the present application provides equipment for exposing edge network capability, including: a processor, and a memory coupled to the processor, wherein the memory stores a program for exposing edge network capability, which can be executed by the processor. When the program for exposing edge network capability is executed by the processor, the steps of the above method for exposing edge network capability are performed.

In addition, an embodiment of the present application further provides a storage medium having a program for exposing edge network capability stored therein. When the program for exposing edge network capability is executed by a processor, the steps of the above method for exposing edge network capability are performed.

The other aspects may be understood after reading and understanding the drawings and the detailed description.

DETAILED DESCRIPTION

The embodiments of the present application are described in detail below with reference to the accompanying drawings. It should be understood that the embodiments described below are merely for illustrating and explaining the present application, but do not limit the present application.

Embodiment 1

Figure 1:
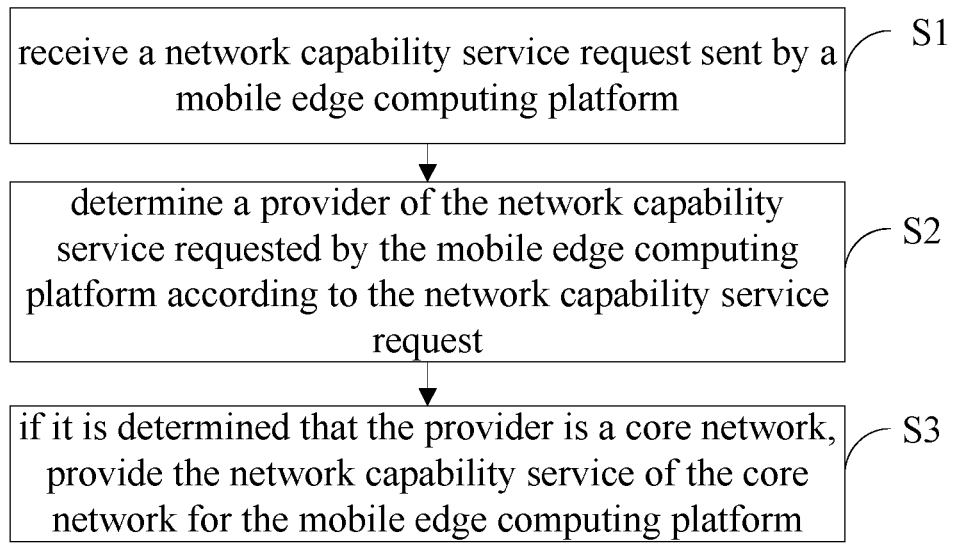
FIG. 1 is a flowchart illustrating a method for exposing edge network capability according to an embodiment of the present disclosure.

FIG. 1 is a flowchart illustrating a method for exposing edge network capability according to an embodiment of the present disclosure. As shown in FIG. 1, a method for exposing edge network capability according to the embodiment includes the following steps S1 to S3.

At step S1, a network capability service request sent by a Mobile Edge Computing (MEC) platform is received.

At step S2, a provider of the network capability service requested by the mobile edge computing platform is determined according to the network capability service request.

In an exemplary implementation, the step S2 may include: parsing the network capability service request to obtain a message title or a uniform resource locator (URL) path; and determining the provider of the network capability service requested by the mobile edge computing platform according to the message title or the uniform resource locator path. The provider of the network capability service may be a radio access network or a core network. At step S3, if it is determined that the provider of the network capability service is a core network, providing the network capability service of the core network to the mobile edge computing platform.

In an exemplary implementation, before the step S3, a network capability service query request carrying an instance identifier is sent to the core network via a protocol reference point interface used for interacting with the core network, and then a network capability service list returned by the core network according to the instance identifier is received via the protocol reference point interface used for interacting with the core network.

In an exemplary implementation, the step S3 may include: if the network capability service requested by the mobile edge computing platform is found in the network capability service list, providing the found network capability service to the mobile edge computing platform.

In an exemplary implementation, if it is determined in the step S2 that the provider of the network capability service is a radio access network, the network capability service of the radio access network may be provided for the mobile edge computing platform. Exemplarily, in practical application, an information acquisition request carrying a terminal identifier and an information acquisition identifier is sent to the radio access network via a protocol reference point interface used for interacting with the radio access network, then terminal-related information returned by the radio access network according to the terminal identifier and the information acquisition identifier is received via the protocol reference point interface used for interacting with the radio access network, and finally, the network capability services of the radio access network are updated according to the terminal-related information. In this way, in a case where providing the network capability service of the radio access network, if the network capability service requested by the mobile edge computing platform is found in the updated network capability services of the radio access network, the found network capability service may be provided for the mobile edge computing platform.

The embodiment may be implemented by building an eNEF (Edge NEF, Edge Network Exposure Function) which is configured to perform direct information interacting with the radio access network and the core network, and is provided with a protocol reference point interface for interacting with the radio access network and a protocol reference point interface for interacting with the core network. When the MEC platform sends a network capability service request to the eNEF for requesting a network capability service, for example, acquiring UE location information or a measurement report, the eNEF may determine whether the requested network capability service is provided by the RAN (Radio Access Network) or the core network after receiving the network capability service request via a service API (Application Programming Interface); if it is determined that the requested network capability service is provided by the RAN, the eNEF provides the network capability service for the MEC platform, for example, sending the UE location information to the MEC platform via the service API; and if it is determined that the requested network capability service is provided by the core network, the eNEF requests the network capability service from the core network, and provides the network capability service of the core network for the MEC platform.

It should be understood by those skilled in the art that all or part of the steps in the method of the embodiment described above may be implemented by instructing related hardware by a program, and the program may be stored in a computer-readable storage medium.

Embodiment 2

An embodiment of the present application further provides a storage medium having a program for exposing edge network capability stored therein. When the program is executed by a processor, the steps of the above method for exposing edge network capability exposure are performed. The storage medium may include a read-only memory (ROM)/random-access memory (RAM), a magnetic disk, an optical disc and a USB flash drive.

Embodiment 3

Figure 2:
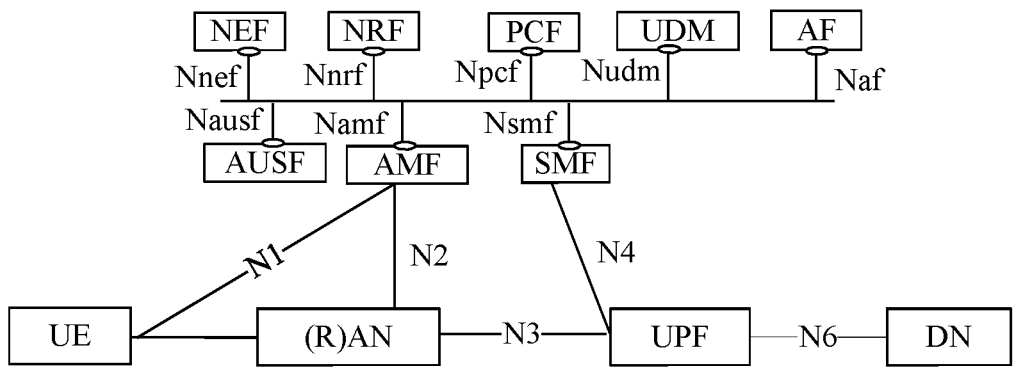
FIG. 2 is a diagram of a 5G (5-th generation) system architecture.
Figure 3:
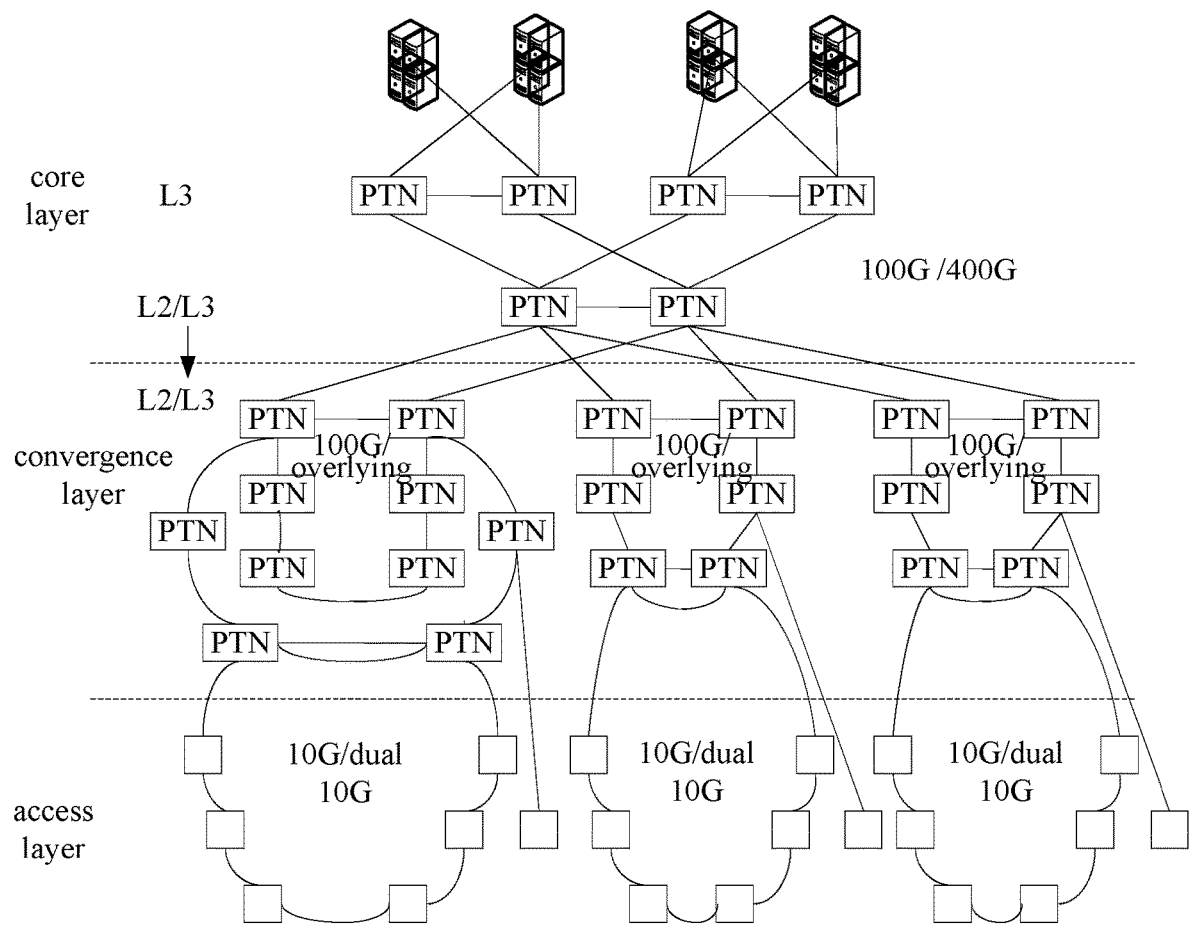
FIG. 3 is a diagram of a current transmission network hierarchy of the operators.

A service-based 5G system architecture is defined in 3GPP (Third Generation Partnership Project) SA2 (system architecture). As shown in FIG. 2, a 5G system may include: UE, RAN (Radio Access Network), UPF (User Plane Function), SMF (Session Management Function), AMF (Access and Mobility Management Function), AUSF (Authentication Server Function), NRF (Network Repository Function), PCF (Policy Control Function), UDM (Unified Data Management), NEF (Network Exposure Function), AF (Application Function), and DN (Data Network). The SMF is responsible for session access and management, including UPF selection/reselection; the AMF is responsible for UE access and mobility management; AUSF is responsible for UE authentication; the NRF is responsible for enabling mutual discovery of network functions; the PCF is responsible for policies and rules of a control plane; the UDM is responsible for management of information, such as user ID; and the NEF is a functional module for exposing network capabilities by a 3GPP network to third-party Apps. The NEF acquires information and service interfaces of other functional modules of the CN (Core Network) through a service-based interface, and exposes to the third-party Apps via a northbound service interface. In principle, the specifications do not define where the NEF may be deployed. In general, the current transmission networks of the operators are divided into an access layer, a convergence layer and a core layer, as shown in FIG. 3. It should be noted that reference may be made to the relevant definitions and descriptions in 3GPP SA2 for the interfaces (e.g. N1, N2, etc.) between different network functions in FIG. 2, which thus will not be repeated herein. In FIG. 3, PTN is a Packet Transport Network.

In the 5G architecture, a Distributed Unit is deployed in the access layer, a Centralized Unit and the UPF (User Plane Function) are deployed in the convergence layer, and edge computing is also arranged in the convergence layer; and all the functions of the core network, except for the UPF, are deployed in the core layer. For security reasons, in actual deployment, the core layer and the convergence layer/access layer are isolated from each other through network isolation, and communicate with each other only via standard interfaces, such as an interface N2 between the AMF and the RAN, and an interface N4 between the SMF and the UPF. The network functions deployed in the RAN cannot directly call the network functions deployed on the CN side via service interfaces. Therefore, the NEF cannot communicate with the other network functions across domains in 3GPP due to such network domain isolation, and the NEF can only be deployed on the CN side in practical application. However, it is possible that the MEC platform is deployed on the RAN side and the NEF needs to expose the wireless capabilities of the RAN. But, at present, 3GPP does not well solve the problem of how the Apps on the MEC platform on the RAN side acquire network capabilities, because, by exposing the NEF via a northbound service interface in the CN, the access path for the App on the RAN side is too long, and the capabilities on the RAN side need to pass through the CN first before being exposed, which increases unnecessary delay and bandwidth, and is not consistent with the original purpose of the MEC.

A diagram of 5G system architecture and flowcharts of implementation processes provided by the embodiments of the present application are described below.

Figure 4:
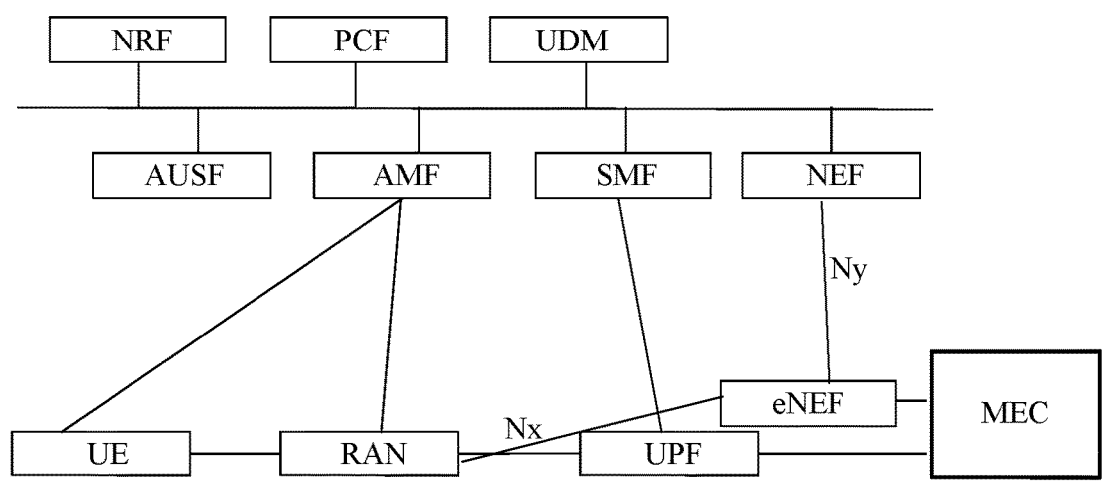
FIG. 4 is a diagram of a 5G system architecture according to an embodiment of the present application.

FIG. 4 is a diagram of 5G system architecture according to an embodiment of the present application. As shown in FIG. 4, according to an embodiment of the present application, an eNEF is introduced into the RAN side, and has two protocol reference point interfaces (i.e., Nx and Ny) with the two network functions: the RAN and the NEF, respectively. The 5G network exposes network capabilities to a network edge computing platform on the RAN side through the eNEF.

1. The protocol reference point interface between the eNEF and the RAN is Nx.

The eNEF acquires the network information of the RAN side via the protocol reference point interface Nx. The eNEF processes the network information of the RAN side, and then exposes to the MEC platform as the network capability of the RNA side via a service API (Application Programming Interface).

The eNEF may directly expose the capability services of the RAN to the MEC platform.

2. The protocol reference point interface between the eNEF and the NEF is Ny.

The eNEF is connected to the NEF of the core network via the protocol reference point interface Ny. The eNEF may query and acquire the services of the NEF via the protocol reference point interface Ny.

The eNEF may acquire the corresponding service from the NEF according to the service type consumed by the MEC.

Embodiment 4

Figure 5:
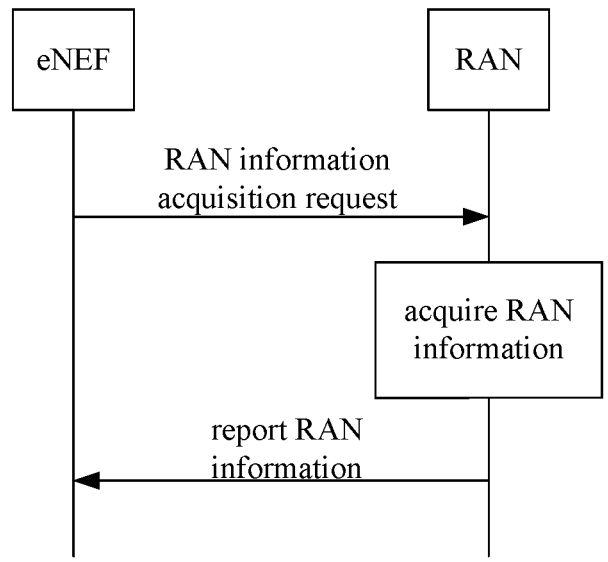
FIG. 5 is a flowchart of acquiring network information of a RAN side by an eNEF (Edge Network Exposure Function) via an interface Nx.

FIG. 5 is a flowchart of acquiring the network information of the RAN side by the eNEF via the interface Nx. As shown in FIG. 5, a process of acquiring the network information of the RAN side by the eNEF via the interface Nx includes the following steps: the eNEF sends an information acquisition request to the RAN via the interface Nx, the request including a UE ID (identifier), an information acquisition ID and an information reporting mode; after receiving the information acquisition request, the RAN acquires information according to the UE ID, the information acquisition ID and the information reporting mode, extracts UE-related information, encapsulates the extracted information in an information acquisition response message, and sends it to the eNEF; and the eNEF receives the information acquisition response message sent by the RAN, extracts data from the information acquisition response message, and updates the services of the RAN accordingly.

In the embodiment, the eNEF updates the stored data according to the data acquired from the RAN, so as to provide the network capability service of the RAN side for the MEC platform via the service API by use of the updated data.

Embodiment 5

Figure 6:
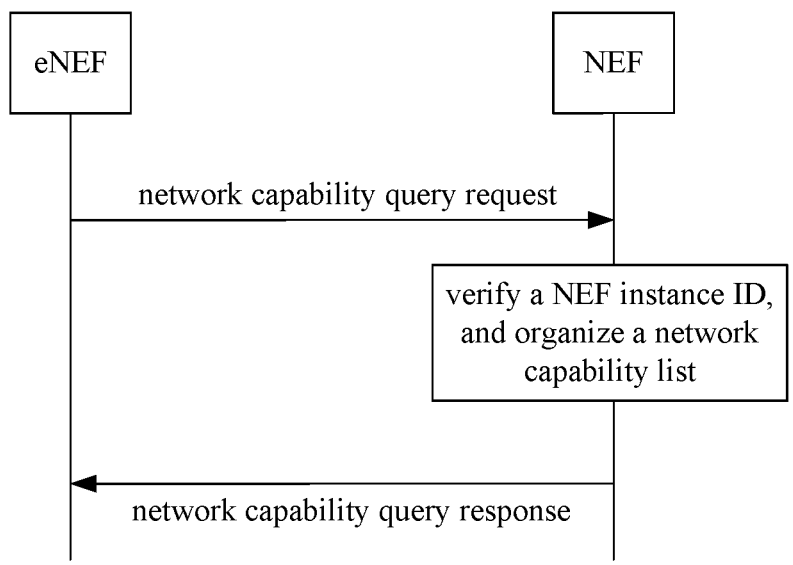
FIG. 6 is a flowchart of acquiring a network capability service list of a NEF (Network Exposure Function) by an eNEF via an interface Ny.

FIG. 6 is a flowchart of acquiring a network capability service list of the NEF by the eNEF via the interface Ny. As shown in FIG. 6, a process of acquiring a network capability service list of the NEF by the eNEF via the interface Ny includes the following steps: the eNEE sends a network capability service query request to the NEF via the interface Ny, the request including a NEF instance ID; the NEF receives the network capability service query request from the eNEF, and verifies whether there is an instance ID that is consistent with this instance, and if yes, the NEF loads its own network capability service list into a network capability query response message, and sends it to the eNEF.

In the embodiment, the eNEF acquires the network capability service list from the NEF, so as to provide the network capability services of the NEF to the MEC platform via the service API by use of the network capability service list.

Embodiment 6

Figure 7:
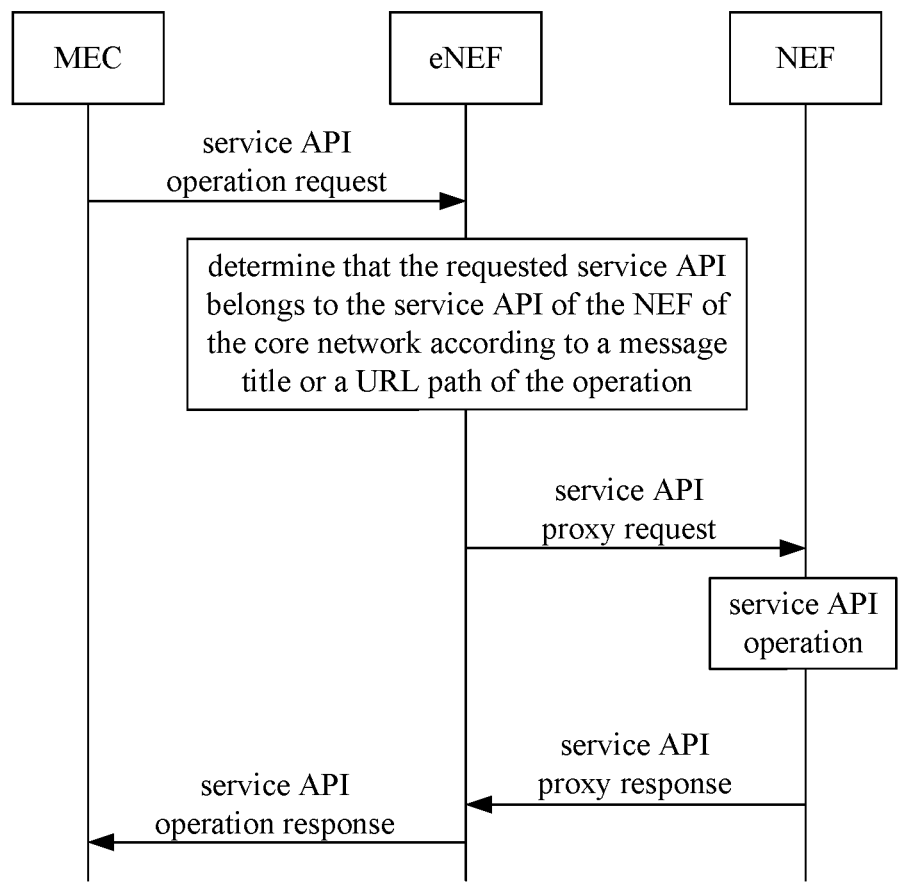
FIG. 7 is a flowchart of exposing network capability of a NEF to a MEC platform.

FIG. 7 is a flowchart of exposing the network capability of the NEF to the MEC platform. As shown in FIG. 7, a process of exposing the network capability of the NEF to the MEC platform includes the following steps: the eNEF receives network capability API operation (i.e., a service API operation request) from the MEC platform; the eNEF determines that the requested operation belongs to the services of the NEF of the core network according to the message title or URL (uniform resource locator) path of the network capability API operation, encapsulates the request in a container, and sends to the NEF via the interface Ny; the NEF takes out the container after receiving the message, implements the operation of a corresponding network capability, encapsulates an operation result in a message through a container, and sends to the eNEF via the interface Ny; and the eNEF extracts the container after receiving the message, encapsulates a response result in an operation response API, and returns the response result to the MEC platform.

In the embodiment, the eNEF receives the operation request from the MEC platform via the service API used for interacting with the MEC platform. When the eNEF determines that the network capability service requested by the MEC platform belongs to the services provided by the NEF and the NEF has started the service, the eNEF acquires the network capability from the NEF via the service API used for interacting with the NEF, and provides the network capability to the MEC platform.

Embodiment 7

Figure 8:
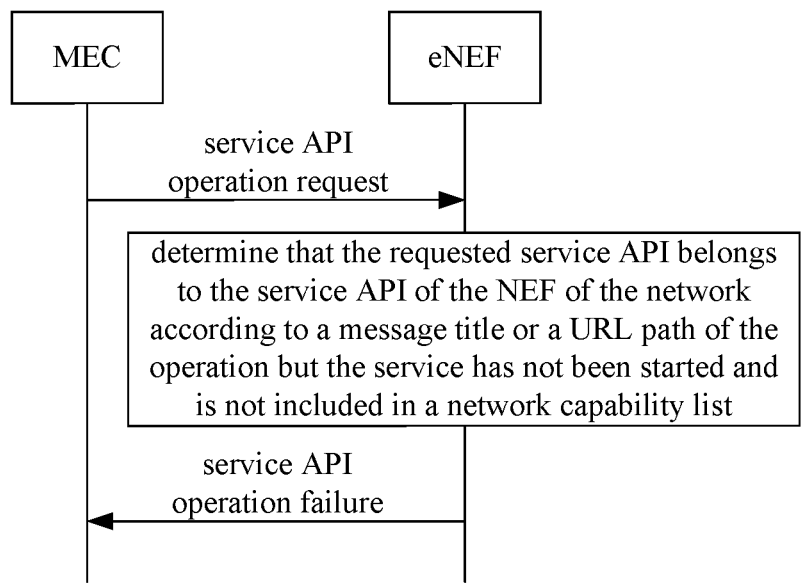
FIG. 8 is a flowchart of requesting network capability of a NEF by a MEC platform.

FIG. 8 is a flowchart of requesting the network capability of the NEF by the MEC platform. As shown in FIG. 8, an operation process of the eNEF and the MEC platform includes the following steps: the eNEF receives network capability API operation (i.e., a service API operation request) from the MEC platform; and the eNEF determines that the requested operation belongs to the services of the NEF of the core network according to the message title or URL path of the network capability API operation but the NEF has not started the service, and then the eNEF directly returns an API operation failure to the MEC platform.

In the embodiment, the eNEF receives the operation request from the MEC platform via the service API used for interacting with the MEC platform. When the eNEF determines that the network capability service requested by the MEC platform belongs to the services provided by the NEF but the NEF has not started the service, the eNEF cannot acquire the network capability of the NEF.

Embodiment 8

Figure 9:
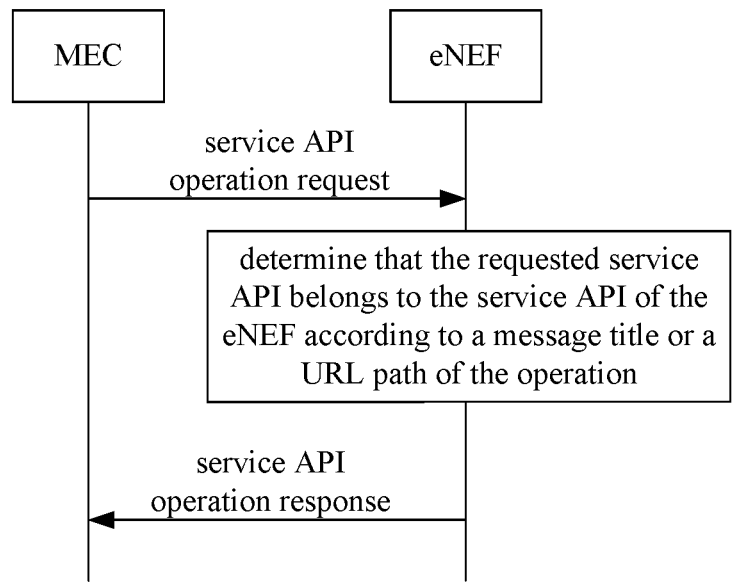
FIG. 9 is a flowchart of exposing network capability of a RAN (Radio Access Network) side to a MEC platform.

FIG. 9 is a flowchart of exposing the network capability of the RAN side to the MEC platform. As shown in FIG. 9, a process of exposing the network capability of the RAN side to the MEC platform includes the following steps: the eNEF receives network capability API operation (i.e., a service API operation request) from the MEC platform; the eNEF determines that the requested operation belongs to the RAN services of the eNEF according to the message title or URL path of the network capability API operation; and the eNEF directly returns an API operation result to the MEC platform.

In the embodiment, the eNEF receives the operation request from the MEC platform via the service API used for interacting with the MEC platform. When the eNEF determines that the network capability service requested by the MEC platform belongs to the services provided by the RAN side, the eNEF provides the network capability of the RAN side to the MEC platform.

According to the Embodiments 3 to 8, an eNEF is added on the RAN side to perform direct information interacting with the two network functions: the RAN and the NEF of the core network, so that the network capabilities can be exposed to the MEC platform deployed in the RAN under a condition of reducing the unnecessary delay and bandwidth, which is applicable to a 5G network.

Embodiment 9

Figure 10:
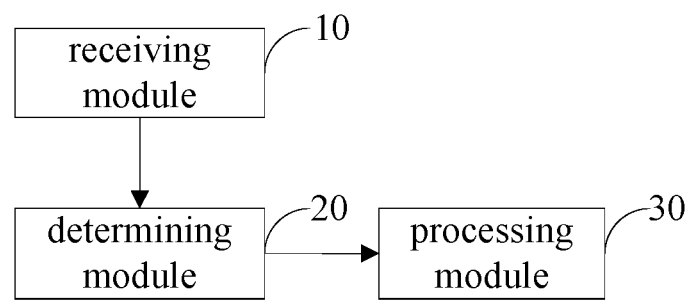
FIG. 10 is a block diagram of an apparatus for exposing edge network capability according to an embodiment of the present application.

FIG. 10 is a block diagram of an apparatus for exposing edge network capability according to an embodiment of the present application. As shown in FIG. 10, the apparatus is configured to perform direct information interacting with a radio access network and a core network, and includes a receiving module 10, a determining module 20 and a processing module 30.

The receiving module 10 is configured to receive a network capability service request sent by a mobile edge computing platform; the determining module 20 is configured to determine a provider of the network capability service requested by the mobile edge computing platform according to the network capability service request; and the processing module 30 is configured to provide the network capability service of a core network to the mobile edge computing platform if it is determined that the provider of the network capability service is the core network.

As an implementation, the apparatus may be disposed on the RAN side, and perform the steps of the method for exposing edge network capability, so as to expose the network capabilities to the MEC platform deployed in the RAN.

Embodiment 10

Figure 11:
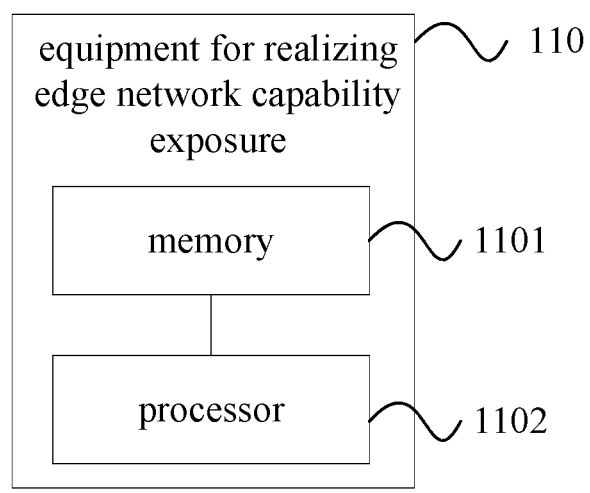
FIG. 11 is a schematic diagram of equipment for exposing edge network capability according to an embodiment of the present application.

FIG. 11 is a schematic diagram of equipment for exposing edge network capability according to an embodiment of the present application. As shown in FIG. 11, the equipment 110 for exposing edge network capability provided by the embodiment is configured to perform direct information interacting with a radio access network and a core network, and includes a processor 1102, and a memory 1101 coupled to the processor 1102; and the memory 1101 stores a program for exposing edge network capability, which can be executed by the processor 1102. When the program for exposing edge network capability is executed by the processor 1102, the steps of the above method for exposing edge network capability are implemented.

As an implementation, the equipment 110 may be disposed on the RAN side, and perform the steps of the method for exposing edge network capability, so as to expose the network capabilities to the MEC platform deployed in the RAN.

To sum up, according to the embodiments of the present application, an eNEF is added on the RAN side, so that the network capabilities can be exposed to the MEC platform deployed in the RAN in a 5G network. According to the embodiments of the present application, information interaction are carried out with the two network functions: the radio access network and the core network, so that the network capabilities can be exposed to the MEC platform under the condition of reducing the unnecessary delay and bandwidth, which is applicable to the 5G network.

It should be understood by those skilled in the art that the functional modules/units in all or some of the steps, the systems, and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on computer-readable media, which may include computer storage media (or non-transitory media). As well known by those skilled in the art, the term "storage media" includes volatile/nonvolatile and removable/non-removable media used in any method or technology for storing information (such as computer-readable instructions, data structures, program modules and other data). The storage media include, but are not limited to, RAMs, ROMs, EEPROMs, flash memories or other memory techniques, CD-ROMs, digital versatile disks (DVDs) or other optical discs, magnetic cassettes, magnetic tapes, magnetic disks or other magnetic storage devices, or any other media which can be used to store the desired information and can be accessed by a computer.

Although the present application is described in detail above, the present application is not limited thereto, and various modifications can be made by those skilled in the art according to the principles of the present application. Any modification made in accordance with the principles of the present application should be considered to fall within the scope of the present disclosure.

What is claimed is:

1. A method for exposing edge network capability, applied to an Edge Network Exposure Function (eNEF) deployed on a Radio Access Network (RAN) side, comprising:
   receiving a network capability service request sent by a mobile edge computing (MEC) platform deployed on the RAN side;
   determining a provider of the network capability service requested by the MEC platform according to the network capability service request;
   providing, in response to determining that the provider of the network capability service is a core network, the network capability service of the core network to the MEC platform; and
   providing, in response to determining that the provider of the network capability service is a radio access network, the network capability service of the radio access network to the MEC platform.

2. The method of claim 1, wherein determining the provider of the network capability service requested by the MEC platform according to the network capability service request comprises:
   parsing the network capability service request to obtain a message title or a uniform resource locator path; and
   determining the provider of the network capability service requested by the MEC platform according to the message title or the uniform resource locator path.

3. The method of claim 1, before providing the network capability service of the core network to the MEC platform, further comprising:
   sending a network capability service query request carrying an instance identifier to the core network via a protocol reference point interface used for interacting with the core network; and
   receiving a network capability service list returned by the core network according to the instance identifier via the protocol reference point interface used for interacting with the core network.

4. The method of claim 3, wherein providing the network capability service of the core network to the MEC platform comprises:
   providing, in response to the network capability service requested by the MEC platform being found in the network capability service list, the found network capability service to the MEC platform.

5. The method of claim 1, before providing the network capability service of the radio access network tor the MEC platform, further comprising:
   sending an information acquisition request carrying a terminal identifier and an information acquisition identifier to the radio access network via a protocol reference point interface used for interacting with the radio access network;
   receiving terminal-related information returned by the radio access network according to the terminal identifier and the information acquisition identifier via the protocol reference point interface used for interacting with the radio access network; and
   updating the network capability services of the radio access network by use of the terminal-related information.

6. The method of claim 5, wherein providing the network capability service of the radio access network to the MEC platform comprises:
   providing, in response to the network capability service requested by the MEC platform being found in the updated network capability services of the radio access network, the found network capability service to the MEC platform.

7. An equipment for exposing edge network capability, applied to an Edge Network Exposure Function (eNEF) deployed on a Radio Access Network (RAN) side, comprising: a processor, and a memory coupled to the processor and storing a program for exposing edge network capability and capable of being executed by the processor, wherein when the program for exposing edge network capability is executed by the processor, the processor performs:
   receiving a network capability service request sent by a mobile edge computing (MEC) platform deployed on the RAN side;
   determining a provider of the network capability service requested by the MEC platform according to the network capability service request;
   providing, in response to determining that the provider of the network capability service is a core network, the network capability service of the core network to the MEC platform; and
   providing, in response to determining that the provider of the network capability service is a radio access network, the network capability service of the radio access network to the MEC platform.

8. The equipment of claim 7, wherein when the program for exposing edge network capability is executed by the processor, the processor performs:
   parsing the network capability service request to obtain a message title or a uniform resource locator path; and
   determining the provider of the network capability service requested by the MEC platform according to the message title or the uniform resource locator path.

9. The equipment of claim 7, wherein when the program for exposing edge network capability is executed by the processor, before providing the network capability service of the core network to the MEC platform, the processor performs:
   sending a network capability service query request carrying an instance identifier to the core network via a protocol reference point interface used for interacting with the core network; and
   receiving a network capability service list returned by the core network according to the instance identifier via the protocol reference point interface used for interacting with the core network.

10. The equipment of claim 9, wherein when the program for exposing edge network capability is executed by the processor, the processor performs:
- providing, in response to the network capability service requested by the MEC platform being found in the network capability service list, the found network capability service to the MEC platform.

11. The equipment of claim 7, wherein when the program for exposing edge network capability is executed by the processor, before providing the network capability service of the radio access network tor the MEC platform, the processor performs:
- sending an information acquisition request carrying a terminal identifier and an information acquisition identifier to the radio access network via a protocol reference point interface used for interacting with the radio access network;
- receiving terminal-related information returned by the radio access network according to the terminal identifier and the information acquisition identifier via the protocol reference point interface used for interacting with the radio access network; and
- updating the network capability services of the radio access network by use of the terminal-related information.

12. The equipment of claim 11, wherein when the program for exposing edge network capability is executed by the processor, the processor performs:
- providing, in response to the network capability service requested by the MEC platform being found in the updated network capability services of the radio access network, the found network capability service to the MEC platform.

13. A non-transitory computer-readable storage medium storing a program for exposing edge network capability, applied to an Edge Network Exposure Function (eNEF) deployed o a Radio Access Network (RAN) side, wherein when the program for exposing edge network capability is executed by a processor, the processor performs:
- receiving a network capability service request sent by a mobile edge computing (MEC) platform deployed on the RAN side;
- determining a provider of the network capability service requested by the MEC platform according to the network capability service request;
- providing, in response to determining that the provider of the network capability service is a core network, the network capability service of the core network to the MEC platform; and
- providing, in response to determining that the provider of the network capability service is a radio access network, the network capability service of the radio access network to the MEC platform.

14. The storage medium of claim 13, wherein when the program for exposing edge network capability is executed by the processor, the processor performs:
- parsing the network capability service request to obtain a message title or a uniform resource locator path; and
- determining the provider of the network capability service requested by the MEC platform according to the message title or the uniform resource locator path.

15. The storage medium of claim 13, wherein when the program for exposing edge network capability is executed by the processor, before providing the network capability service of the core network to the MEC platform, the processor performs:
- sending a network capability service query request carrying an instance identifier to the core network via a protocol reference point interface used for interacting with the core network; and
- receiving a network capability service list returned by the core network according to the instance identifier via the protocol reference point interface used for interacting with the core network.

16. The storage medium of claim 15, wherein when the program for exposing edge network capability is executed by the processor, the processor performs:
- providing, in response to the network capability service requested by the MEC platform being found in the network capability service list, the found network capability service to the MEC platform.

17. The storage medium of claim 13, wherein when the program for exposing edge network capability is executed by the processor, before providing the network capability service of the radio access network tor the MEC platform, the processor performs:
- sending an information acquisition request carrying a terminal identifier and an information acquisition identifier to the radio access network via a protocol reference point interface used for interacting with the radio access network;
- receiving terminal-related information returned by the radio access network according to the terminal identifier and the information acquisition identifier via the protocol reference point interface used for interacting with the radio access network; and
- updating the network capability services of the radio access network by use of the terminal-related information.

* * * * *